United States Patent
Gurvich et al.

(10) Patent No.: US 10,272,991 B2
(45) Date of Patent: Apr. 30, 2019

(54) METALLIC COMPOSITE JOINT

(71) Applicant: Goodrich Corporation, Charlotte, NC (US)

(72) Inventors: Mark R Gurvich, Middleton, CT (US); Rony Giovanni Ganis, Oakville (CA)

(73) Assignee: GOODRICH CORPORATION, Charlotte, NC (US)

( * ) Notice: Subject to any disclaimer, the term of this patent is extended or adjusted under 35 U.S.C. 154(b) by 167 days.

(21) Appl. No.: 15/190,978

(22) Filed: Jun. 23, 2016

(65) Prior Publication Data

US 2017/0369157 A1   Dec. 28, 2017

(51) Int. Cl.
| | | |
|---|---|---|
| *B64C 25/00* | (2006.01) | |
| *B29C 70/72* | (2006.01) | |
| *B32B 3/06* | (2006.01) | |
| *B64C 25/60* | (2006.01) | |
| *F16C 7/02* | (2006.01) | |

(52) U.S. Cl.
CPC .............. *B64C 25/00* (2013.01); *B29C 70/72* (2013.01); *B32B 3/06* (2013.01); *B64C 25/60* (2013.01); *F16C 7/026* (2013.01); *F16C 2326/05* (2013.01); *F16C 2326/43* (2013.01)

(58) Field of Classification Search
CPC ........ F16C 3/023; F16C 3/026; F16C 11/045; Y10T 403/32861; Y10T 403/32918; Y10T 403/32934; Y10T 403/37; B29C 66/742; B29C 66/7422; B29C 66/7428; B29C 70/72; B32B 3/06
See application file for complete search history.

(56) References Cited

U.S. PATENT DOCUMENTS

| | | | | |
|---|---|---|---|---|
| 4,706,364 | A | * | 11/1987 | Aubry ..................... B29C 65/00 138/109 |
| 5,203,082 | A | * | 4/1993 | Bontems ............... A01G 25/023 29/890.141 |
| 5,705,005 | A | * | 1/1998 | Ash ......................... B29C 53/36 156/92 |
| 7,335,108 | B2 | * | 2/2008 | Lin ....................... B29C 70/462 464/181 |

(Continued)

FOREIGN PATENT DOCUMENTS

| | | |
|---|---|---|
| EP | 2607229 | 6/2013 |
| EP | 2749776 | 7/2014 |
| GB | 2287681 | 9/1995 |

OTHER PUBLICATIONS

European Patent Office, European Search Report dated Nov. 17, 2017 in Application No. 17177517.4-1754.

*Primary Examiner* — Joseph W Sanderson
(74) *Attorney, Agent, or Firm* — Snell & Wilmer, L.L.P.

(57) ABSTRACT

A composite metallic joint assembly may include a composite metal rod having a metal liner and a composite material disposed around the metal liner. A first portion of the composite metal rod may comprise the composite material and the metal liner and a second portion of the composite metal rod may comprise the metal liner exposed at a radially outer surface of the composite metal rod. The metal liner may have a first radial thickness at a first axial position corresponding to the first portion of the composite metal rod and a second radial thickness at a second axial position corresponding to the second portion of the composite metal rod. The second thickness may be greater than the first thickness.

18 Claims, 9 Drawing Sheets

(56) References Cited

U.S. PATENT DOCUMENTS

| | | | | |
|---|---|---|---|---|
| 7,690,164 | B2* | 4/2010 | Walker | B29C 70/68 |
| | | | | 248/637 |
| 8,414,724 | B2* | 4/2013 | Schnelz | B29C 66/1162 |
| | | | | 156/172 |
| 8,539,843 | B2* | 9/2013 | Inns | B64C 25/00 |
| | | | | 73/862.57 |
| 8,904,904 | B2* | 12/2014 | Stewart | B29C 70/38 |
| | | | | 74/579 R |
| 8,915,157 | B1* | 12/2014 | Kerbs | G01D 11/245 |
| | | | | 73/290 V |
| 9,275,762 | B2* | 3/2016 | Garnier | C04B 35/565 |
| 9,568,040 | B2* | 2/2017 | Ganis | F16B 7/025 |
| 2005/0239562 | A1* | 10/2005 | Lin | B29C 70/462 |
| | | | | 464/181 |
| 2010/0077918 | A1 | 4/2010 | Hoelzl et al. | |
| 2013/0062012 | A1 | 3/2013 | Masson et al. | |
| 2015/0013819 | A1 | 1/2015 | Stewart | |
| 2017/0122482 | A1* | 5/2017 | Lokkinen | F16L 55/1656 |
| 2017/0190149 | A1* | 7/2017 | Grant | B32B 15/14 |
| 2017/0191520 | A1* | 7/2017 | Larson | B29C 53/566 |
| 2017/0369158 | A1* | 12/2017 | Gurvich | B64C 25/02 |

* cited by examiner

METALLIC COMPOSITE JOINT

FIELD

The present disclosure relates generally to composite rod assemblies and more specifically to joints for load-bearing composite rod assemblies.

BACKGROUND

Composite rods and tubes are often used to reduce the weight of structures in industries where weight is a significant factor, such as in the aircraft, rotorcraft, spacecraft and automotive industry. Various types of aircraft utilize composite rods, for example, in landing gear systems. Landing gear components often comprise complex geometries and may involve attaching other materials to composite rods. Conventional methods of attaching other materials to composite materials, such as threading or drilling holes in the composite material, may reduce the strength of the composite material. Further, composite rods are conventionally used to transfer loads applied at the ends of the rod, i.e. tension, compression, bending and/or torque. Composite rods may be limited in strength to handle loads applied along the composite rod at points other than the ends of the rod.

SUMMARY

A composite metallic joint assembly may include a composite metal rod having a metal liner and a composite material disposed around the metal liner. A first portion of the composite metal rod may comprise the composite material and the metal liner. A second portion of the composite metal rod may comprise the metal liner exposed at a radially outer surface of the composite metal rod.

In various embodiments, the metal liner may have a first radial thickness at a first axial position corresponding to the first portion of the composite metal rod and a second radial thickness at a second axial position corresponding to the second portion of the composite metal rod. The second thickness may be greater than the first thickness. The metal liner may comprise an integral load transfer linkage protruding from the metal liner. A load transfer linkage may be coupled to the metal liner. The metal liner may comprise at least one of titanium, titanium alloy, aluminum, aluminum alloy or steel. The composite material may comprise at least one of carbon fiber, glass fiber, aramid fiber, para-aramid fiber or a combination thereof impregnated with a resin. A first locking collar may be disposed about the composite metal rod and contacting at least a portion of the composite material. A second locking collar may be disposed about the composite metal rod. The first locking collar may be coupled to the second locking collar via a bolt. A load transfer linkage may be coupled to at least one of the first locking collar or the second locking collar by the bolt. The load transfer linkage may include at least one of a lug or a joint that may be at least one of coupled to or integral with the metal liner.

A landing gear system in accordance with various embodiments may comprise a strut including a composite metallic joint assembly. The composite metallic joint assembly may comprise a composite metal rod comprising a metal liner and a composite material disposed around the metal liner. A first portion of the composite metal rod may comprise the composite material and the metal liner. A second portion of the composite metal rod may comprise the metal liner exposed at a radially outer surface of the composite metal rod.

In various embodiments, the metal liner may have a first radial thickness at a first axial position corresponding to the first portion of the outer surface. The metal liner may have a second radial thickness at a second axial position corresponding to the second portion of the outer surface. The second thickness may be greater than the first thickness. The metal liner may comprise an integral load transfer linkage protruding from the metal liner. A load transfer linkage may be coupled to the metal liner. The metal liner may comprise at least one of titanium, titanium alloy, aluminum, aluminum alloy or steel. The composite material may comprise at least one of carbon fiber, fiberglass, aramid fiber, para-aramid fiber or a combination thereof impregnated with a resin. A first locking collar may be disposed about the composite metal rod and contacting at least a portion of the composite material. A second locking collar may be disposed about the composite metal rod. The first locking collar may be coupled to the second locking collar via a bolt. A load transfer linkage may be coupled to at least one of the first locking collar or the second locking collar by the bolt. The load transfer linkage may include at least one of a lug or a joint that may be at least one of coupled to or integral with the metal liner.

A method for forming a composite metallic joint assembly may include disposing a fibrous structure including a resin around a metal liner. The metal liner may have a flange that comprises an outer surface of the composite metallic joint assembly. The method may further include curing the resin, and coupling a load transfer linkage to the outer surface.

In various embodiments, the method may further include disposing a first locking collar on the composite metallic joint assembly.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural. Cross hatching lines may be used throughout the figures to denote different parts but not necessarily to denote the same or different materials.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
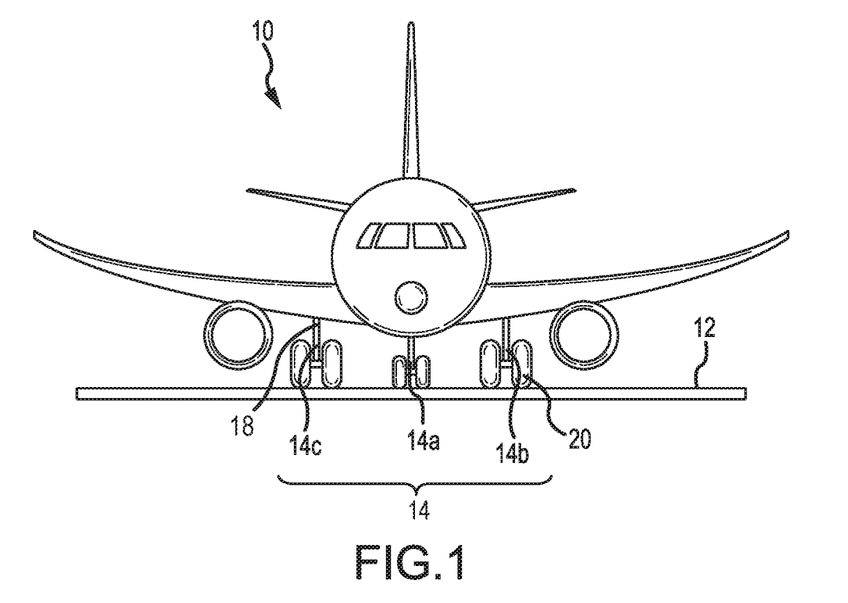
FIG. 1 illustrates landing gear of an aircraft, in accordance with various embodiments.

With reference to FIG. 1, aircraft 10 on runway 12 is shown in a front view, in accordance with various embodiments. The present disclosure describes composite metallic joint assemblies with respect to landing gear of an aircraft 10, however, it will be understood the systems and methods of the present disclosure may be suitable for use in other systems, including rotorcraft, spacecraft and automotive systems. Aircraft 10 may comprise landing gear 14 including a nose landing gear 14a, a left landing gear 14b and a right landing gear 14c each having one or more wheel and brake assemblies or other similar assembly of individual landing gears. Aircraft brakes are used to slow, steer and/or stop the aircraft 10 during taxing. Landing gear 14 may further comprise a structure, for example a strut, shock strut, bogie beam, axle and/or other structure, coupled to one or more wheels of the landing gear. In various embodiments, each landing gear 14 may include a strut 18, which supports one or more wheels 20.

Figure 2A:
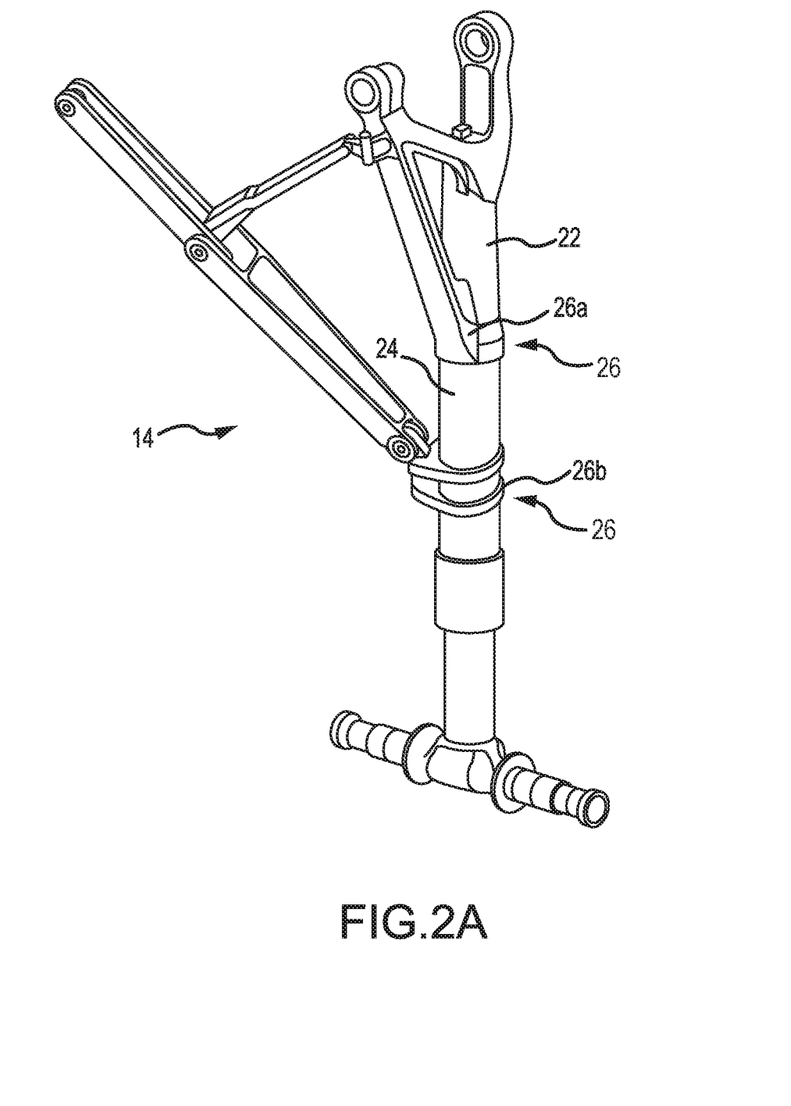
FIGS. 2A, 2B, 2C and 2D illustrate a strut of a landing gear and a plurality of joints along a strut, which may incorporate a composite metal rod and joint assembly, in accordance with various embodiments.

With reference to FIG. 2A, a portion of landing gear 14 is shown in a deployed position, in accordance with various embodiments. Landing gear 14 may include strut 22, which may comprise a composite metal rod 24 having a plurality of joints, such as joint 26a and joint 26b. Each of joints 26 along composite metal rod 24 may comprise a composite metallic joint assembly as will be discussed herein. Although composite metal rod 24 is depicted as a strut 22 for landing gear 14, it should be understood that the concepts described herein are not limited to use with struts and landing gear as the teachings may be applied to other structural rods and/or tubes for use in non-aircraft systems as well.

Figure 2B:
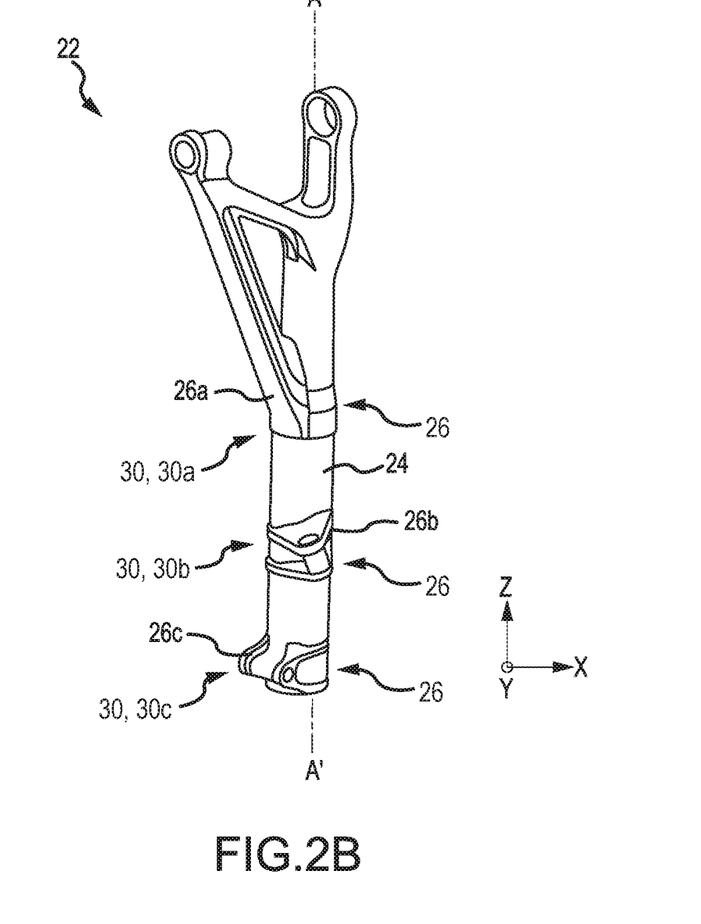

With reference to FIG. 2B, a composite metal rod 24 is shown in a strut 22, in accordance with various embodiments. Composite metal rod 24 may include a longitudinal axis A-A', which is illustrated oriented in the z direction with respect to the provided xyz axis. The xyz axis is provided for reference purposes and longitudinal axis A-A' may be oriented in any direction that is axial to composite metal rod 24. Composite metal rod 24 is illustrated with a plurality of joints 26, including joint 26a, joint 26b and joint 26c, which may each comprise a composite metallic joint assembly 30, such as composite metallic joint assemblies 30a, 30b and 30c, respectively. Joints 26 with composite metallic joint assemblies 30 may be configured to transfer non-axial loads (i.e., loads not along longitudinal axis A-A') to composite metal rod 24.

Figure 2C:
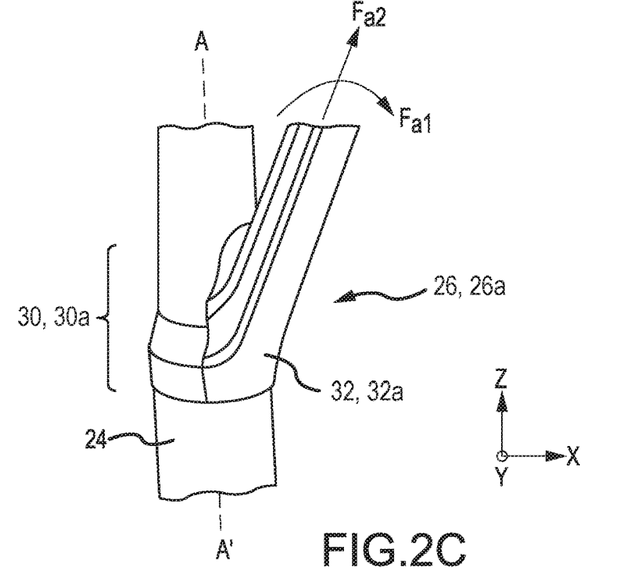
Figure 2D:
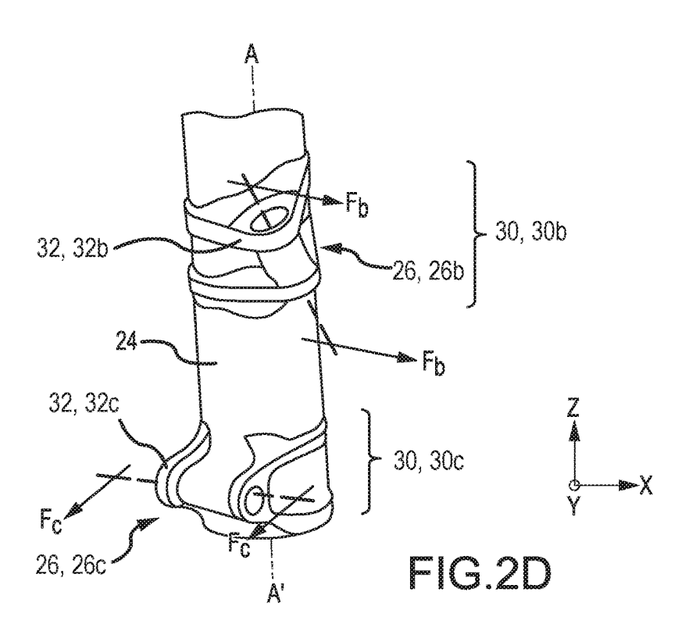

With reference to FIGS. 2C and 2D, composite metallic joint assemblies 30 of various joints 26 are shown in accordance with various embodiments. Each composite metallic joint assembly 30 of joints 26 may comprise a load transfer linkage 32, which may be a load-transferring metallic member, coupled to a composite metal rod 24. Load transfer linkage 32 may include a lug, hook, joint, welded joint, or other linkage or joint. A load transfer linkage 32, such as load transfer linkage 32a (FIG. 2C), load transfer linkage 32b and load transfer linkage 32c (FIG. 2D), may include a projection or protrusion which extends from composite metal rod 24 in various directions and may be coupled to or integral with composite metal rod 24. Load transfer linkage 32b is illustrated in FIG. 2D, for example, as a lug. Load transfer linkage 32c is illustrated in FIG. 2D, for example, as a lug. Load transfer linkages 32 may be load-transferring in that a load transfer linkage 32 may couple to composite metal rod 24 such that a load applied to load transfer linkage 32 may be transferred through load transfer linkage 32 to composite metal rod 24.

In accordance with various embodiments and with reference to FIG. 2C, joint 26a may include a load transfer linkage 32a coupled to composite metal rod 24 to form composite metallic joint assembly 30a. Composite metallic joint assembly 30a may be configured to transfer loads, such as moment $F_{a1}$ and force $F_{a2}$, from load transfer linkage 32a of joint 26a to composite metal rod 24, where moment $F_{a1}$ and force $F_{a2}$ may be non-axial loads, i.e., non-colinear with longitudinal axis A-A' of composite metal rod 24.

In accordance with various embodiments and with reference to FIG. 2D, joint 26b may include load transfer linkage 32b coupled to composite metal rod 24 to form a composite metallic joint assembly 30b. Composite metallic joint assembly 30b may be configured to transfer a load, including a moment or a force, such as force $F_b$, from load transfer linkage 32b of joint 26b to composite metal rod 24. Similarly, joint 26c may include a load transfer linkage 32c coupled to composite metal rod 24 to form a composite metallic joint assembly 30c. Composite metallic joint assembly 30c may be configured to transfer a load, including a moment or a force, such as force $F_c$ from load transfer linkage 32c of joint 26c to composite metal rod 24. Forces $F_b$ and $F_c$ may be non-axial loads, i.e., non-colinear with longitudinal axis A-A' of composite metal rod 24.

Although composite materials provide reduced weight over traditional components, it may be difficult to couple composite materials to metal components. Joining composite materials with metal components often presents challenges due to different material characteristics. In that regard, it may not be suitable to couple a metal load transfer linkage, such as load transfer linkage 32, to a composite rod using traditional methodologies. As described herein, a composite metal rod 24 may be configured with a composite metallic joint assembly 30 to bear a load in various directions. Composite metallic joint assemblies 30 may comprise a composite metal rod 24 having a composite material formed around at least a portion of a metal rod liner.

Figure 3A:
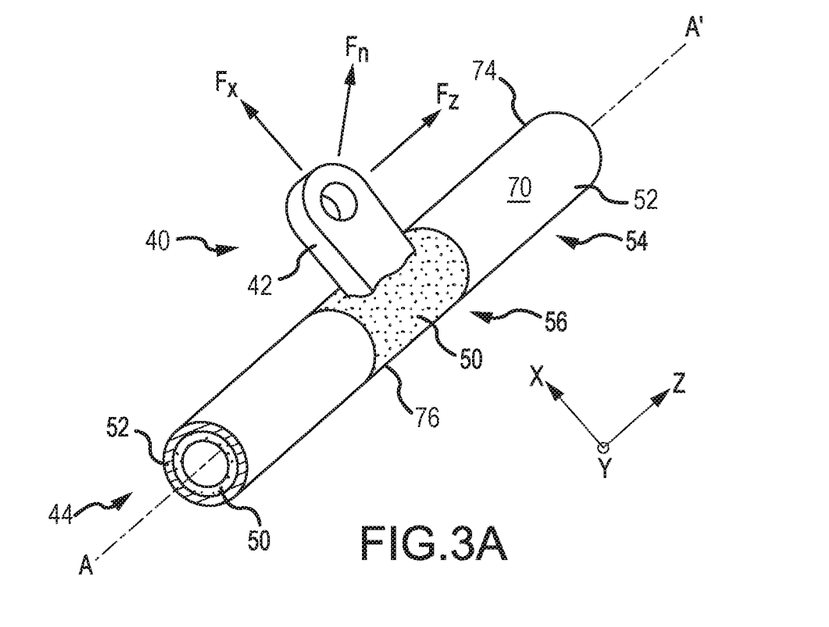
FIGS. 3A, 3B, and 3C illustrate a schematic perspective view and cross-sectional views, respectively, of a composite metal rod and joint assembly, in accordance with various embodiments.

With reference to FIG. 3A, a composite metallic joint assembly 40 including a composite metal rod 44 is shown schematically, in accordance with various embodiments. Composite metallic joint assembly 40 may be similar to composite metallic joint assemblies 30 from FIGS. 2A, 2B, 2C and 2D and may include load transfer linkage 42, which may be a load-transferring metallic element, coupled to a composite metal rod 44. Load transfer linkage 42 is shown in FIG. 3A, for example, as protruding from composite metal rod 44 in the x direction with respect to the provided xyz axis. It will be understood that load transfer linkage 42 may protrude or project from composite metal rod 44 in various directions with respect to the xyz axis. Load transfer linkage 42 may include a projection or protrusion which extends from composite metal rod 24 in various directions and may be coupled to or integral with composite metal rod 24. Load transfer linkage 42 may include a lug, hook, welded joint, or other linkage or joint. Load transfer linkage 42 is illustrated in FIG. 3A, for example, as a lug. Composite metallic joint assembly 40 may be configured to transfer a load from load transfer linkage 42 to composite metal rod 44.

In various embodiments, composite metal rod 44 may include a metal liner 50 and a composite material 52 formed around at least a portion of metal liner 50. Metal liner 50 may comprise various materials, for example, a metal or metal alloy. Exemplary metals according to various embodiments include titanium, aluminum, steel, stainless steel, nickel, cobalt, chromium, and alloys thereof. Composite material 52 may comprise a lightweight polymer-matrix composite material such as a fiber composite material and/or a fiber composite material infiltrated or impregnated with a resin. Composite material 52 may comprise a carbon fiber composite material, a hydrocarbon fiber composite material, a filament wound composite tube, a filament braided tube and/or a combination thereof. Composite material 52 may comprise carbon fiber, ceramic fibers, glass fiber, aramid fibers, para-aramid fibers and/or a combination thereof. Composite material 52 may comprise polyacrylonitrile fibers such as oxidized polyacrylonitrile fibers and/or carbonized polyacrylonitrile fibers. Composite material 52 may comprise fibrous structures comprising one or more of the aforementioned fibers infiltrated with a thermosetting and/or thermoplastic material and/or resin.

Composite metal rod 44 may further include a first portion 54, in which composite material 52 may be disposed around metal liner 50. Composite material 52 may form a tube or rod that is discontinuous along a length of composite metal rod 44, thereby exposing a portion of metal liner 50. Composite metal rod 44 may include a second portion 56, in which metal liner 50 is exposed at an outer surface 70, which may be a radially outer surface, of composite metal rod 44. Composite material 52 may cover a first portion of metal liner 50 while leaving a second portion of metal liner 50 uncovered with respect to composite material 52. Composite metal rod 44 may include first portion 54 and second portion 56. First portion 54 of composite metal rod 44 may include composite material 52 disposed around metal liner 50. Second portion 56 of composite metal rod 44 may include metal liner 50 without composite material 52. Composite metal rod 44 is depicted in FIG. 3A, for example, as having a uniform wall thickness along a length of composite metal rod 44, wherein a total thickness of composite material 52 and metal liner 50 at first portion 54 may be similar to or substantially equal to a thickness of metal liner 50 at second portion 56. Composite metal rod 44 may have a non-uniform wall thickness along its length. Composite metal rod 44 is depicted in FIG. 3A, for example, as having a round or circular cross-sectional geometry, however, composite metal rod 44 may include elliptical, rectangular, triangular, polygonal, or other cross-sectional geometry.

In various embodiments, composite metal rod 44 may include an outer surface 70 having a composite portion and a metal portion. An outer surface 70 of composite metal rod 44 may include first portion 74 and second portion 76, wherein the first portion 74 of the outer surface 70 comprises the composite material 52 and the second portion 76 of the outer surface 70 comprises the metal liner 50. Metal liner 50 may be exposed with respect to composite material 52 at the second portion 76 of the outer surface 70 of composite metal rod 44.

In various embodiments, load transfer linkage 42 may be coupled to metal liner 50 of composite metal rod 44. Load transfer linkage 42 may be coupled to metal liner 50 such that load transfer linkage 42 protrudes radially or in another direction from composite metal rod 44. Load transfer linkage 42 may be integrally formed with metal liner 50, as an integral load-transferring metallic element protruding from second portion 76 of outer surface 70 of composite metal rod 44. As used herein, the term "integrated" or "integral" may include forming one, single continuous piece. Load transfer linkage 42 may be configured to receive various non-axial forces or a combination of forces in any direction, such as a force Fx, force Fz and/or force Fn. Load transfer linkage 42 may further be configured to receive load conditions defined by bending or twisting moments. Forces and/or loads applied to load transfer linkage 42 may be transferred from load transfer linkage 42 to composite metal rod 44 as non-axial loads. For example, force Fx may be a radial force. As used herein, the term "radial" or "radially" may include a direction primarily directed towards and/or away from a longitudinal axis A-A' of composite metal rod 44. For example, in various embodiments, a radially outward force may be primarily directed away from axis A-A' and, thus, may not necessarily be orthogonal to longitudinal axis A-A' shown in FIG. 3A. Force Fz may be parallel to longitudinal axis A-A', but not colinear with longitudinal axis A-A', such that force Fz may produce a bending moment at composite metal rod 44. Force Fn may be a force in any other direction and may be transferred to composite metal rod 44. Composite metallic joint assembly 40 may be configured to withstand high non-axial loads.

Figure 3B:
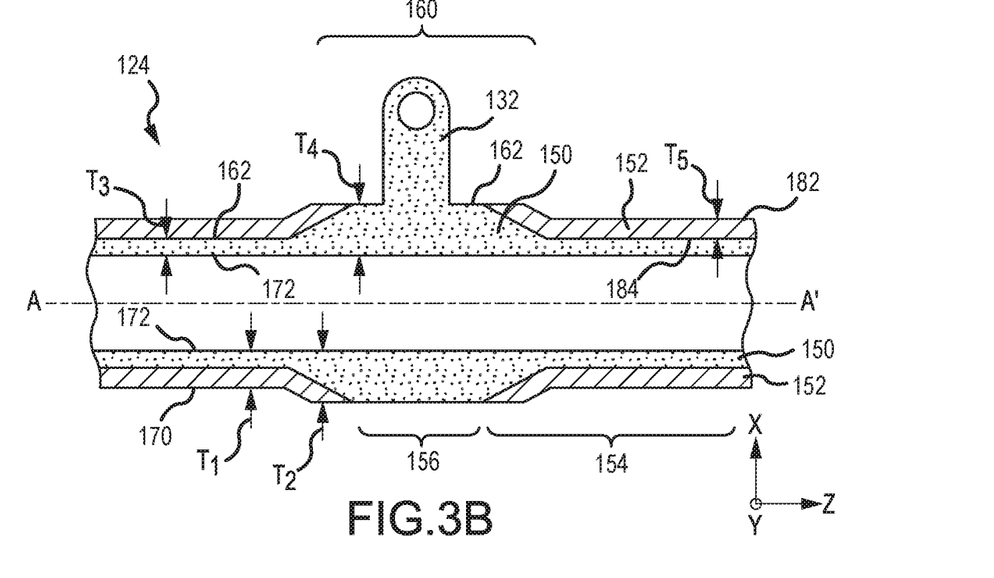

With reference to FIG. 3B, a composite metal rod 124 including a load transfer linkage 132 is shown, in accordance with various embodiments. Composite metal rod 124 in FIG. 3B may be similar to composite metal rod 44 from FIG. 3A and may be configured with a non-uniform wall thickness. A composite material 152 may be disposed around metal liner 150 at first portion 154 of composite metal rod 124, while composite material 152 may not be disposed around metal liner 150 at second portion 156 of composite metal rod 124. An outer surface 170, which may be a radially outer surface, of composite metal rod 124 may include composite material 152 at first portion 154 and may include metal liner 150 at second portion 156. Thus, metal liner 150 may be exposed with respect to composite material 152 at outer surface 170 of composite metal rod 124. Composite metal rod 124 may include a flared portion 160 at which load transfer linkage 132 is attached to metal liner 150. Load transfer linkage 132 may be coupled to an outer surface 162 of metal liner 150 at flared portion 160 of composite metal rod 124. Flared portion 160 may be defined by a greater radial thickness than the radial thickness of composite metal rod 124 away from load transfer linkage 132. Flared portion 160 may be configured with a tapered, sloped or angled geometry. Load transfer linkage 132 may include a projection or protrusion which extends from composite metal rod 124 in various directions and may be coupled to or integral with composite metal rod 124. Load transfer linkage 132 may include a lug, hook, welded joint, or other linkage or joint. Load transfer linkage 132 is illustrated in FIG. 3B, for example, as a lug.

In various embodiments, composite metal rod 124 may include a first radial thickness $T_1$ at a first axial position corresponding to the first portion 154 of composite metal rod 124, wherein the first radial thickness $T_1$ is measured across a radial distance from an outer surface 170 to an inner surface 172 of composite metal rod 124. Inner surface 172 may comprise an inner surface of composite metal rod 124 and/or an inner surface of metal liner 150. Composite metal rod 124 may further include a second radial thickness $T_2$ at a second axial position corresponding to the second portion 156 of composite metal rod 124, i.e. at flared portion 160 of composite metal rod 124, wherein the second radial thickness $T_2$ is measured across a radial distance from an outer surface 170 to an inner surface 172 at flared portion 160 of composite metal rod 124. A second radial thickness $T_2$ at flared portion 160 may be greater than first radial thickness $T_1$ of composite metal rod 124. Composite metal rod 124 may transition from first radial thickness $T_1$ to second radial thickness $T_2$ by a gradual increase from first radial thickness $T_1$ to second radial thickness $T_2$, such that outer surface 170 of composite metal rod 124 may be generally smooth.

In various embodiments, metal liner 150 may have a greater thickness at flared portion 160. Metal liner 150 may include a first radial thickness $T_3$ at a first axial position corresponding to the first portion 154 of composite metal rod 124, wherein the first radial thickness $T_3$ is measured across a radial distance from an outer surface 162 to an inner surface 172 of metal liner 150. Metal liner 150 may further include a second radial thickness $T_4$ at a second axial position corresponding to the second portion 156 of composite metal rod 124, wherein the second radial thickness $T_4$ is measured across a radial distance from an outer surface 162 to an inner surface 172 of metal liner 150 at flared portion 160 of composite metal rod 124. A second thickness $T_4$ of metal liner 150 may be greater than the first thickness $T_3$ of metal liner 150. Outer surface 162 of metal liner 150 may be configured with a tapered, sloped or angled geometry, wherein outer surface 162 may be a radially outer surface of metal liner 150. Metal liner 150 may transition from first radial thickness $T_3$ to second radial thickness $T_4$ by a gradual increase from first radial thickness $T_3$ to second radial thickness $T_4$, such that outer surface 162 of metal liner 150 may be generally smooth.

In various embodiments, a radial thickness $T_5$ of composite material 152 (as measured across a radial distance from an outer surface 182 to an inner surface 184) may be chosen according to various design considerations and may vary along a length (longitudinal axis A-A') of composite metal rod 124. A radial thickness $T_5$ of composite material 152 may be generally uniform along a length of composite metal rod 124, as depicted in FIG. 3B. In various embodiments, radial thickness $T_5$ of composite material 152 may be greater at an axial position corresponding to the first portion 154 of composite metal rod 124, and further, radial thickness $T_5$ of composite material 152 may decrease at flared portion 160. In various embodiments, radial thickness $T_5$ of composite material 152 may be greater than the first radial thickness $T_3$ of metal liner 150 and further may be less than the second radial thickness $T_4$ of metal liner 150.

Figure 3C:
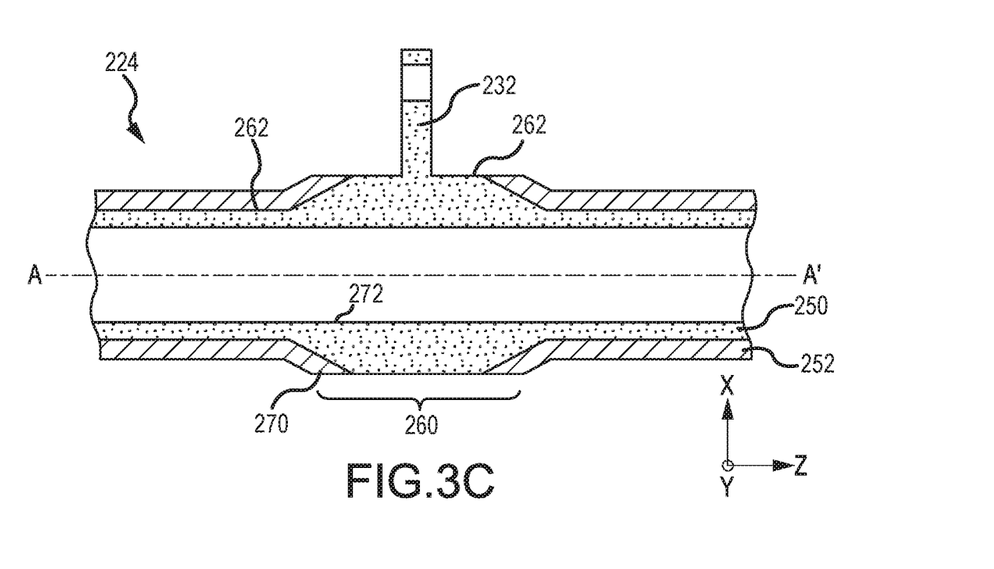

With reference to FIG. 3C, a composite metal rod 224 including a load transfer linkage 232 is shown, in accordance with various embodiments. Composite metal rod 224 in FIG. 3C may be similar to composite metal rod 124 from FIG. 3B and may be configured with a load transfer linkage 232 oriented 90 degrees in the yx plane from the orientation of load transfer linkage 132 in FIG. 3B. A composite material 252 may be disposed around metal liner 250 to form composite metal rod 224. An outer surface 270 of composite metal rod 224 may include metal liner 250 and composite material 252, wherein outer surface 270 of composite metal rod 224 may be a radially outer surface of composite metal rod 224. Outer surface 270 of composite metal rod 224 may include outer surface 262 of metal liner 250, which is at least partially exposed with respect to composite material 252. An inner surface 272 of composite metal rod 224 may include metal liner 250. Composite metal rod 224 may include a flared portion 260 at which load transfer linkage 232 is attached. Metal liner 250 may be exposed with respect to composite material 252 at flared portion 260. Load transfer linkage 232 may be coupled to an outer surface 262 of metal liner 250 or may be formed integrally with metal liner 250. Load transfer linkage 232 may include a projection or protrusion which extends from composite metal rod 224 in various directions and may be coupled to or integral with composite metal rod 224. Load transfer linkage 232 may include a lug, hook, welded joint, or other linkage or joint. Load transfer linkage 232 is illustrated in FIG. 3C, for example, as a lug. Load transfer linkage 232 may be configured to receive various non-axial forces or a combination of forces in any direction, including bending or twisting moments. Forces and/or loads applied to load transfer linkage 232 may be transferred from load transfer linkage 232 to composite metal rod 224 as non-axial loads.

Figure 4A:
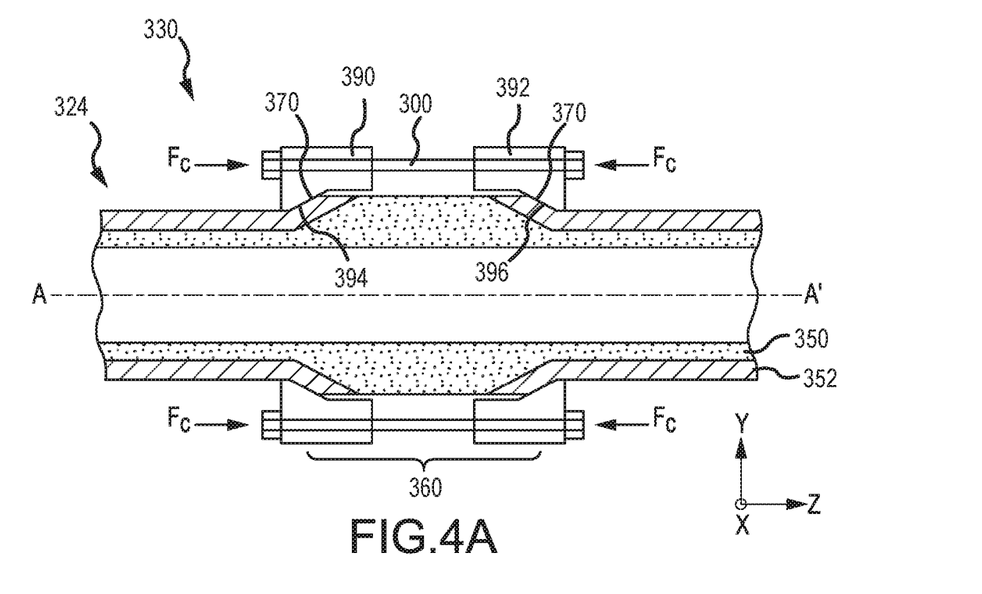
FIGS. 4A and 4B illustrate cross-sectional views of a composite metallic joint assembly, in accordance with various embodiments.

With reference to FIG. 4A, a composite metallic joint assembly 330 is shown, in accordance with various embodiments. In various embodiments, composite metallic joint assembly 330 may comprise a composite metal rod 324, which may include a composite material 352 disposed around a portion of a metal liner 350. Composite metal rod 324 may be similar to composite metal rod 124 in FIG. 3B and may include one or more load transfer linkages, or load-transferring metallic elements, such as load transfer linkages 132 from FIG. 3B, coupled to metal liner 350. A cross-section of composite metal rod 324 is depicted in FIG. 4A out of plane with one or more load transfer linkages, which may be coupled to or integrally formed with metal liner 350.

In various embodiments, composite metallic joint assembly 330 may comprise one or more collars or locking rings, such as a first locking collar 390 and a second locking collar 392. A first locking collar 390 may be disposed about the outer surface 370 of composite metal rod 324 and contacting at least a portion of composite material 352. A second locking collar 392 may be disposed about the outer surface 370 of composite metal rod 324 and contacting at least a portion of composite material 352. A first locking collar 390 and a second locking collar 392 may be positioned around flared portion 360 of composite metal rod 324. First locking collar 390 and second locking collar 392 may comprise an inner surface geometry that is complementary to flared portion 360 of composite metal rod 324. For example, first locking collar 390 may include a tapered surface 394 configured to interface with outer surface 370 of composite metal rod 324 at flared portion 360. Similarly, second locking collar 392 may include a tapered surface 396 configured to interface with outer surface 370 of composite metal rod 324 at flared portion 360.

In various embodiments, first locking collar 390 and second locking collar 392 may be configured to receive one or more fasteners or bolts 300. Fasteners, such as bolts 300, may be passed through first locking collar 390 and second locking collar 392 to mechanically couple first locking collar 390 to second locking collar 392. Fasteners may include rivets, bolts, or other suitable fasteners to couple first locking collar 390 to second locking collar 392. The first locking collar 390 may be coupled to the second locking collar 392 via a bolt 300. In various embodiments, a compressive force Fc may be applied to first locking collar 390 and second locking collar 392 by bolts 300, thereby coupling locking collars 390, 392 to composite metal rod 324. The bolt 300 may be coupled to and retain a load transfer linkage. In various embodiments, bolts 300 may further be configured to pass through a load transfer linkage, such as load transfer linkage 432 (see FIG. 4B), such that fasteners may pass through first locking collar 390, a load transfer linkage and/or second locking collar 392.

Figure 4B:
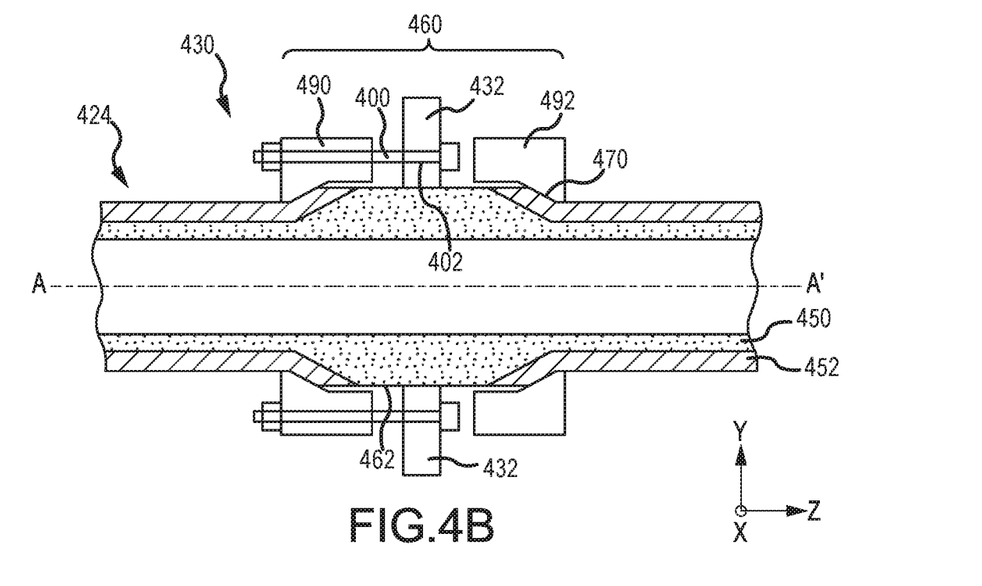

With reference to FIG. 4B, a composite metallic joint assembly 430 is shown, in accordance with various embodiments. Composite metallic joint assembly 430 may comprise a composite metal rod 424, which may include a composite material 452 disposed around a portion of a metal liner 450. Composite metal rod 424 may be similar to composite metal rod 224 in FIG. 3C and may include one or more load transfer linkages 432, or load-transferring metallic elements, coupled to metal liner 450.

In various embodiments, load transfer linkage 432 may be coupled to composite metal rod 424 through first locking collar 490 and second locking collar 492. Load transfer linkage 432 may include a projection or protrusion which extends from composite metal rod 424 in various directions and may be coupled to or integral with composite metal rod 424. Load transfer linkage 432 may include a lug, hook, welded joint, or other linkage or joint. Load transfer linkage 432 is illustrated in FIG. 4B, for example, as a lug. Load transfer linkage 432 may or may not be directly attached to outer surface 462 of metal liner 450. Load transfer linkage 432 may be positioned adjacent to outer surface 462 of metal liner 450 at flared portion 460 of composite metal rod 424. Load transfer linkage 432 may include a plurality of apertures 402 for receiving bolts 400. One or more bolts 400 may be passed through first locking collar 490 and load transfer linkage 432 to mechanically couple load transfer linkage 432 to first locking collar 490. Additionally, one or more bolts 400 may be passed through second locking collar 492 and load transfer linkage 432 to mechanically couple load transfer linkage 432 to second locking collar 492. Apertures 402 in load transfer linkage 432 may, in various embodiments, receive bolts 400 passing through first locking collar 490 and second locking collar 492, such that bolts 400 extending from first locking collar 490 and second locking collar 492 and through load transfer linkage 432 produce a compressive force thereby coupling locking collars 490, 492 and load transfer linkage 432 to composite metal rod 424. Composite metallic joint assembly 430 may be configured to transfer various non-axial forces, including bending or twisting moments from load transfer linkages 432 to composite metal rod 424.

Figure 5A:
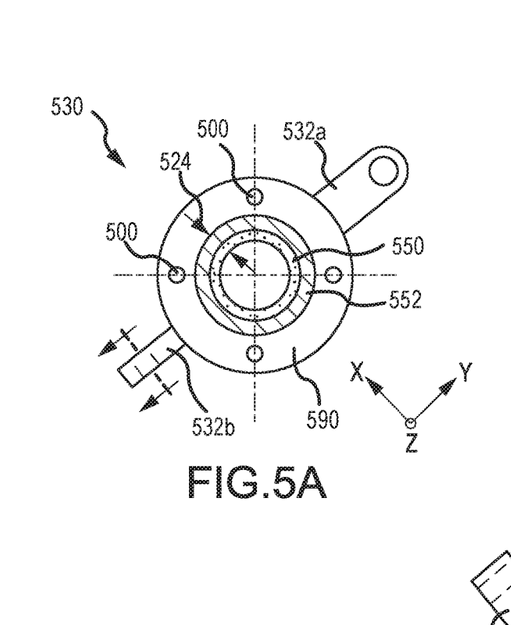
FIGS. 5A, 5B, and 5C illustrate axial cross-sectional views of a composite metallic joint assembly, in accordance with various embodiments.

With reference to FIG. 5A, a cross-section in the xy plane of composite metallic joint assembly 530 is shown, in accordance with various embodiments. Composite metallic joint assembly 530 may be similar to composite metallic joint assembly 330 from FIG. 4A, wherein one or more load transfer linkages may be out of plane in the view shown by FIG. 4A, but are now shown in the cross-section of FIG. 5A. Composite metallic joint assembly 530 may comprise composite metal rod 524, including composite material 552 disposed around a portion of metal liner 550 and including a plurality of load transfer linkages 532a, 532b extending from composite metal rod 524. Load transfer linkages 532a, 532b may be coupled to or integral with metal liner 550 and may be oriented in various directions with respect to composite metal rod 524. As depicted in FIG. 5A, composite metallic joint assembly 530 is shown with two load transfer linkages, including a first load transfer linkage 532a oriented in a first direction and a second load transfer linkage 532b oriented in a second direction rotated 90 degrees with respect to the first direction. It will be understood that composite metallic joint assembly 530 may include greater than or fewer than two load transfer linkages and that load transfer linkages 532a, 532b may be oriented in various directions and be configured to receive non-axial forces. Load transfer linkages 532a, 532b may include lugs, hooks, welded joints, or other linkages or joints. Load transfer linkages 532a, 532b are illustrated in FIG. 5A, for example, as lugs.

In various embodiments, composite metallic joint assembly 530 may comprise a first locking collar 590 (shown in FIG. 5A) as well as a second locking collar (such as second locking collar 392 from FIG. 4A). Composite metallic joint assembly 530 may further comprise one or more bolts 500 extending in the z direction through first locking collar 590 and a second locking collar and positioned around a circumference of composite metal rod 524. In various embodiments, bolts 500 passing through first locking collar 590 and second locking collar (such as second locking collar 392 from FIG. 4A) may be disposed at intervals around a circumference of first locking collar 590. A position of bolts 500 may be selected to permit space for one or more load transfer linkages 532 to protrude from composite metal rod 524. Composite metallic joint assembly 530 may be configured to transfer various non-axial forces, including bending or twisting moments from load transfer linkages 532a, 532b to composite metal rod 524.

Figure 5B:
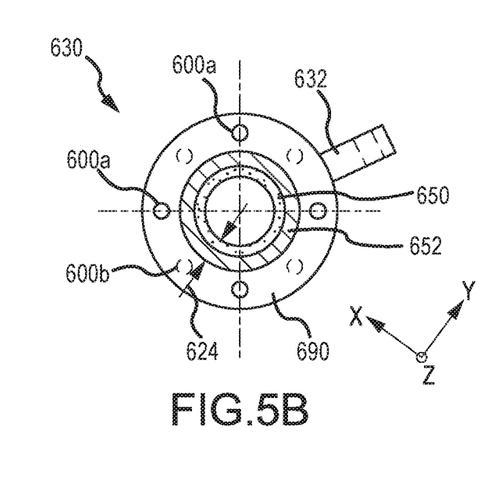

With reference to FIG. 5B, a cross-section in the xy plane of composite metallic joint assembly 630, in accordance with various embodiments. Composite metallic joint assembly 630 may be similar to composite metallic joint assembly 430 from FIG. 4B and may include one or more load transfer linkages 632 or load-transferring metallic elements, similar to load transfer linkages 432 from FIG. 4B. Composite metallic joint assembly 630 may comprise composite metal rod 624, including composite material 652 disposed around a portion of metal liner 650 and including a load transfer linkage 632 extending from composite metal rod 624. Load transfer linkage 632 may be coupled to an outer surface of metal liner 650 or may be formed integrally with metal liner 650. Load transfer linkage 632 may include a lug, hook, welded joint, or other linkage or joint. Load transfer linkage 632 is illustrated in FIG. 5B, for example, as a lug. Composite metallic joint assembly 630 may further comprise a first locking collar 690 (shown in FIG. 5B) as well as a second locking collar (such as second locking collar 492 from FIG. 4B). As depicted in FIG. 5B, composite metallic joint assembly 630 is shown with eight bolts, including bolts 600a and bolts 600b disposed in alternating positions around composite metal rod 624. Bolts 600a may extend in the z direction through first locking collar 690 and load transfer linkage 632. Bolts 600b may extend in the z direction through a second locking collar and load transfer linkage 632. It will be understood that composite metallic joint assembly 630 may include greater than or fewer than eight bolts and that bolts 600a, 600b may be positioned at different locations around a circumference of composite metal rod 624. Composite metallic joint assembly 630 may be configured to transfer various non-axial forces, including bending or twisting moments from load transfer linkage 632 to composite metal rod 624.

Figure 5C:
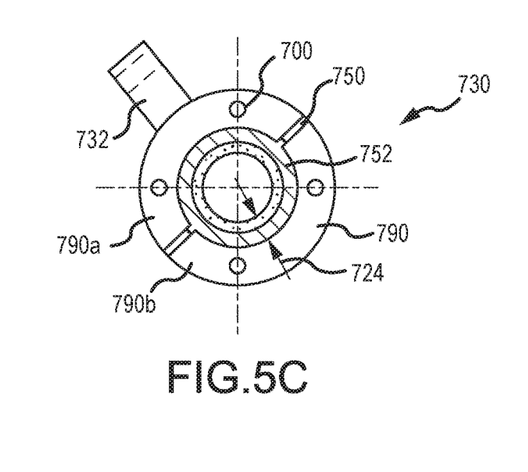

With reference to FIG. 5C, a cross-section of composite metallic joint assembly 730 is shown, in accordance with various embodiments. Composite metallic joint assembly 730 may comprise a composite metal rod 724, which may include a composite material 752 disposed around a portion of a metal liner 750. Composite metallic joint assembly 730 may include a load transfer linkage 732 extending from composite metal rod 724. Load transfer linkage 732 may be coupled to an outer surface of metal liner 750 or may be formed integrally with metal liner 750. Load transfer linkage 732 may include a lug, hook, welded joint, or other linkage or joint. Load transfer linkage 732 is illustrated in FIG. 5C, for example, as a lug. Composite metallic joint assembly 730 may further comprise a first locking collar 790. First locking collar 790 may comprise one or more portions, such as a first portion 790a and a second portion 790b.

Referring to FIG. 4A and still to FIG. 5C, first locking collar 390 and second locking collar 392 from FIG. 4A may each include a continuous piece or may be comprised of a plurality of portions, such as first portion 790a and second portion 790b from FIG. 5C. Referring now to FIG. 4B and still to FIG. 5C, first locking collar 490 and second locking collar 492 from FIG. 4B may each include a continuous piece or may be comprised of a plurality of portions, such as first portion 790a and second portion 790b as shown in FIG. 5C. Returning to FIG. 5C, first portion 790a and second portion 790b of first locking collar 790 may be completely separated or may be partially separated, such as by a groove. First portion 790a and second portion 790b of first locking collar 790 may be positioned around a circumference of composite metal rod 724 and may be coupled together, such as by mechanical coupling. Composite metallic joint assembly 730 may further comprise one or more bolts 700 extending in the z direction through first locking collar 790. Bolts 700 may extend through first locking collar 790, and through a second locking collar or a load transfer linkage, or load-transferring metallic elements, such as load transfer linkage 732. Bolts 700 extending from first locking collar 790 and a second locking collar and/or load transfer linkage 732 produce a compressive force thereby securing load transfer linkage 732 to composite metal rod 724. Composite metallic joint assembly 730 may be configured to transfer various non-axial forces, including bending or twisting moments from load transfer linkages 732 to composite metal rod 724.

Figure 6:
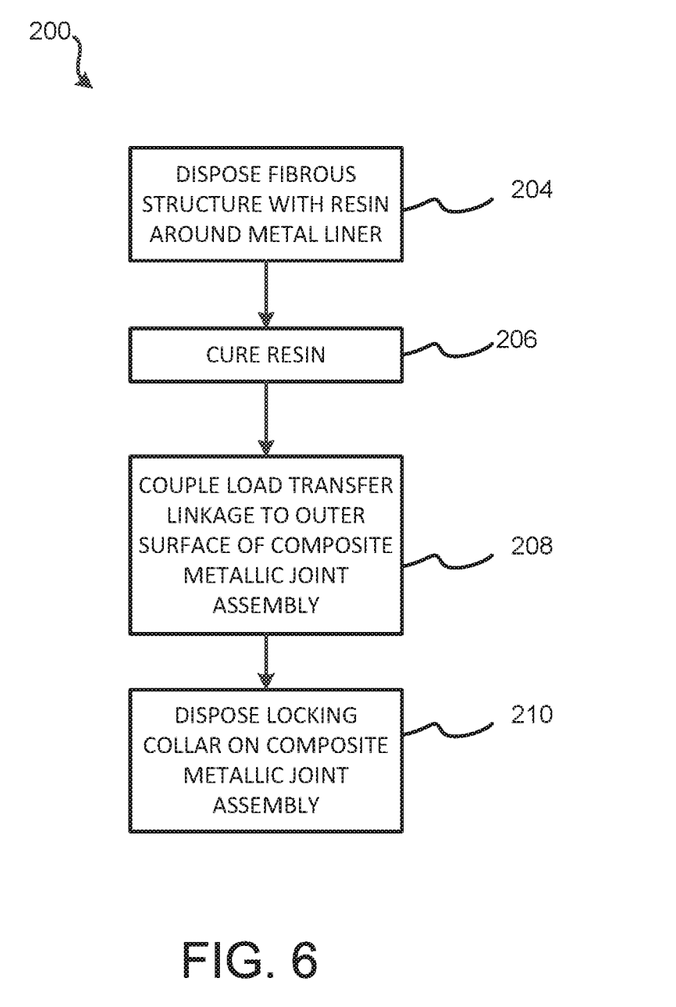
FIG. 6 illustrates a method of forming a composite metallic joint assembly, in accordance with various embodiments.

With reference to FIG. 6, a method 200 of forming a composite metallic joint assembly (from FIGS. 3A-3C, 4A-4B and 5A-5C) is shown, in accordance with various embodiments. Method 200 may include the step of may include disposing a fibrous structure with resin around a metal liner (step 204), curing the resin (step 206), and coupling a load transfer linkage to the outer surface of composite metallic joint assembly (step 208). Method 200 may further include disposing a locking collar on the composite metallic joint assembly (step 210).

Step 204 may further include impregnating the fibrous structure with a resin. Step 204 may further include laying composite sheets or layers in a desired shape over a metal liner and bonding the layers together using resins, adhesives, or other bonding agents. In further embodiments, composite material may be formed using a fiber-wound form, wherein fiber is continuously wound onto the form and bonded together using resins, adhesives, or other bonding agents. Any manner of forming composite material is within the scope of the present disclosure.

Referring still to FIG. 6 and now to FIG. 4B, for example, step 208 may further include forming load transfer linkage 432 integrally with metal liner 450, attaching load transfer linkage 432 to metal liner 450, or coupling load transfer linkage 432 to composite metal rod 424 through a first locking collar 490 and a second locking collar 492. Load transfer linkage 432 may be attached to metal liner 450 by welding, bonding, bolting or other suitable process. Load transfer linkage 432 and metal liner 450 may be manufactured by forging, casting, additive manufacturing, machining or the like. Metal liner 450 may have a flange, such as flared portion 460, that comprises an outer surface 470 of the composite metallic joint assembly. Step 208 may include coupling load transfer linkage 432 to outer surface 470 of the composite metallic joint assembly 430.

Step 210 may further include disposing a first locking collar 490 and a second locking collar 492 around composite metal rod 424 at flared portion 460. Step 210 may further include coupling load transfer linkage 432 to a first locking collar 490 and a second locking collar 492 with a fastener, such as a bolt 400. First locking collar 490 and second locking collar 492 may apply a compressive force to a flange, such as flared portion 460, to couple load transfer linkage 432 to composite metal rod 424.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A composite metallic joint assembly, comprising:
a composite metal rod having an intermediate flared section and comprising a metal liner and a composite material disposed around the metal liner;
wherein a first portion of the composite metal rod comprises the composite material and the metal liner;
wherein a second portion of the composite metal rod comprises the metal liner exposed at a radially outer surface of the composite metal rod; and
wherein the intermediate flared section is disposed at the second portion.

2. The composite metallic joint assembly of claim 1, wherein the metal liner has a first radial thickness at a first axial position corresponding to the first portion of the composite metal rod and a second radial thickness at a second axial position corresponding to the second portion of the composite metal rod, the second thickness being greater than the first thickness.

3. The composite metallic joint assembly of claim 2, wherein the metal liner comprises an integral load transfer linkage protruding from the metal liner along the flared section.

4. The composite metallic joint assembly of claim 2, further comprising a load transfer linkage coupled to the metal liner along the flared section.

5. The composite metallic joint assembly of claim 2, further comprising a first locking collar disposed about the composite metal rod and contacting at least a portion of the composite material.

6. The composite metallic joint assembly of claim 5, further comprising a second locking collar disposed about the composite metal rod, the first locking collar coupled to the second locking collar via a bolt.

7. The composite metallic joint assembly of claim 6, further comprising a load transfer linkage coupled to at least one of the first locking collar or the second locking collar by the bolt, wherein the load transfer linkage includes at least one of a lug or a joint that is at least one of coupled to or integral with the metal liner.

8. The composite metallic joint assembly of claim 1, wherein the metal liner comprises at least one of titanium, titanium alloy, aluminum, aluminum alloy or steel.

9. The composite metallic joint assembly of claim 1, wherein the composite material comprises at least one of carbon fiber, glass fiber, aramid fiber or para-aramid fiber impregnated with a resin.

10. A landing gear system, comprising:
a strut including a composite metallic joint assembly, the composite metallic joint assembly comprising:
a composite metal rod having an intermediate flared section and comprising a metal liner and a composite material disposed around the metal liner,
wherein a first portion of the composite metal rod comprises the composite material and the metal liner;
wherein a second portion of the composite metal rod comprises the metal liner exposed at a radially outer surface of the composite metal rod; and
wherein the intermediate flared section is disposed at the second portion.

11. The landing gear system of claim 10, wherein the metal liner has a first radial thickness at a first axial position corresponding to the first portion of the composite metal rod and a second radial thickness at a second axial position corresponding to the second portion of the composite metal rod, the second thickness being greater than the first thickness.

12. The landing gear system of claim 11, wherein the metal liner comprises an integral load transfer linkage protruding from the metal liner along the flared section.

13. The landing gear system of claim 11, further comprising a load transfer linkage coupled to the metal liner along the flared section.

14. The landing gear system of claim 11, further comprising a first locking collar disposed about the composite metal rod and contacting at least a portion of the composite material.

15. The landing gear system of claim 14, further comprising a second locking collar disposed about the composite metal rod, the first locking collar coupled to the second locking collar via a bolt.

16. The landing gear system of claim 15, further comprising a load transfer linkage coupled to at least one of the first locking collar or the second locking collar by the bolt, wherein the load transfer linkage includes at least one of a lug or a joint that is at least one of coupled to or integral with the metal liner.

17. The landing gear system of claim 10, wherein the metal liner comprises at least one of titanium, titanium alloy, aluminum, aluminum alloy or steel.

18. The landing gear system of claim 10, wherein the composite material comprises at least one of carbon fiber, glass fiber, aramid fiber or para-aramid fiber impregnated with a resin.

* * * * *